United States Patent
Li et al.

(10) Patent No.: US 11,038,931 B2
(45) Date of Patent: Jun. 15, 2021

(54) METHOD FOR INTERNET PROTOCOL BASED MULTIMEDIA SUBSYSTEM REGISTRATION AND DEVICE, COMMUNICATION DEVICE, AND STORAGE MEDIUM

(71) Applicant: BEIJING XIAOMI MOBILE SOFTWARE CO., LTD., Beijing (CN)

(72) Inventors: Wentao Li, Beijing (CN); Hengbin Cui, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/742,419

(22) Filed: Jan. 14, 2020

(65) Prior Publication Data

US 2021/0092164 A1   Mar. 25, 2021

(30) Foreign Application Priority Data

Sep. 24, 2019  (CN) .......................... 201910907670.4

(51) Int. Cl.
| | | |
|---|---|---|
| H04L 29/06 | (2006.01) | |
| H04W 60/06 | (2009.01) | |
| H04L 29/12 | (2006.01) | |

(52) U.S. Cl.
CPC ...... *H04L 65/1016* (2013.01); *H04L 61/1588* (2013.01); *H04L 65/1069* (2013.01); *H04L 65/1073* (2013.01); *H04W 60/06* (2013.01)

(58) Field of Classification Search
CPC combination set(s) only.
See application file for complete search history.

(56) References Cited

U.S. PATENT DOCUMENTS

| | | | |
|---|---|---|---|
| 2009/0097398 A1 | 4/2009 | Belinchon Vergara et al. | |
| 2009/0318147 A1* | 12/2009 | Zhang | H04L 61/1588 455/435.1 |
| 2010/0146131 A1* | 6/2010 | Hu | H04L 65/1069 709/228 |
| 2015/0181513 A1* | 6/2015 | Sharma | H04W 48/18 370/328 |
| 2015/0350983 A1* | 12/2015 | Kwok | H04L 65/1016 370/331 |
| 2017/0347258 A1* | 11/2017 | Carbone | H04L 65/1063 |
| 2018/0270891 A1* | 9/2018 | Kim | H04N 21/6583 |
| 2019/0149583 A1 | 5/2019 | Jutila et al. | |
| 2020/0305211 A1* | 9/2020 | Foti | H04L 65/1016 |

OTHER PUBLICATIONS

Extended European Search Report dated Jun. 2, 2020 in European Patent Application No. 20152658.9, citing documents AA and AB therein, 9 pages.

\* cited by examiner

*Primary Examiner* — Steven S Kelley
(74) *Attorney, Agent, or Firm* — Oblon, McClelland, Maier & Neustadt, L.L.P.

(57) ABSTRACT

The disclosure relates to a method for Internet Protocol based Multimedia Subsystem (IMS) registration and device, a communication device, and a storage medium. The method for IMS registration includes determining whether a network side supports an IMS service; acquiring, based on an IMS Access Point Name (APN), an address for the IMS registration when the network side supports the IMS service; performing the IMS registration based on the acquired address for the IMS registration; and initiating an IMS re-registration when the IMS registration fails.

11 Claims, 6 Drawing Sheets

METHOD FOR INTERNET PROTOCOL BASED MULTIMEDIA SUBSYSTEM REGISTRATION AND DEVICE, COMMUNICATION DEVICE, AND STORAGE MEDIUM

CROSS-REFERENCE TO RELATED APPLICATIONS

This application is filed based upon and claims priority to Chinese Patent Application No. 201910907670.4, filed on Sep. 24, 2019, the entire contents of which are incorporated herein by reference.

TECHNICAL FIELD

The present disclosure relates to the technical field of communications, and more particularly, to a method for Internet Protocol Multimedia Subsystem (IMS) registration and device, a communication device, and a storage medium.

BACKGROUND

An IMS service includes a voice call service. However, before the voice call service is used, an IMS registration needs to be performed. After the IMS registration is successful, a voice call in the IMS service can be obtained through an IMS technology. However, in the related art, the IMS registration of a terminal sometimes fails. If the IMS registration fails, a voice call function in the IMS service cannot be used, which may cause the voice call quality of the terminal to be impaired.

For example, the voice service in the IMS service includes: Voice over Long Term Evolution (VoLTE), which is a voice call service that can provide high call quality. With the gradual use of $4^{th}$ Generation (4G) network or $5^{th}$ Generation (5G) network, $2^{nd}$ Generation (2G) network and $3^{rd}$ Generation (3G) network will be retired. At this time, the voice call function of VoLTE becomes more and more important. After the IMS registration is successful, the high call quality of VoLTE can be enjoyed. If the IMS registration fails or is not performed, the terminal cannot use the voice call function of VoLTE.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for Internet Protocol Multimedia Subsystem (IMS) registration, the method being applied to a terminal. The method includes determining whether a network side supports an IMS service; acquiring, based on an IMS Access Point Name (APN), an address for the IMS registration when the network side supports the IMS service; performing the IMS registration based on the acquired address for the IMS registration; and initiating an IMS re-registration when the IMS registration fails.

In an example, when initiating the IMS re-registration, the method further includes initiating the IMS re-registration when a number of times that the IMS registration is performed does not reach a first preset threshold.

According to an aspect, the method further includes re-acquiring an address for an IMS registration when the number of times that the IMS registration is performed reaches the first preset threshold; and initiating the IMS registration based on the re-acquired address for the IMS registration.

In an example, when re-acquiring the address for the IMS registration, the method further includes determining whether a number of times that acquisition for the address the IMS registration is performed reaches a second preset threshold; and re-acquiring the address for the IMS registration when the number of times that the acquisition is performed does not reach the second preset threshold.

According to an aspect, the method further includes controlling the terminal to enter a flight mode when the number of times that the acquisition is performed reaches the second preset threshold; controlling the terminal to exit the flight mode after the terminal enters the flight mode for a predetermined duration; and performing network attach after the terminal exits the flight mode, wherein determining whether the network side supports the IMS service comprises determining whether the network side supports the IMS service after the terminal is attached to a network.

According to another aspect, the method further includes receiving a reason for a failure of the MS registration; and determining the first preset threshold based on the reason.

In an example, when The determining the first preset threshold, the method further includes determining that the first preset threshold has a first value when the reason for the failure of the IMS registration is that a registration request of the IMS registration is lost; and determining that the first preset threshold has a second value when the reason for the failure of the IMS registration is that an IMS server refuses to register, wherein the second value is less than the first value.

According to an aspect, the method further includes sending an attach request to the network side; receiving an attach acceptance from the network side based on the attach request; and determining whether the network side supports the IMS service based on an IMS service support indication field carried in the attach request.

In an example, when acquiring the address for the IMS registration when the network side supports the IMS service, the method further includes sending a Public Data Network (PDN) connection request to the network side when the network side supports the IMS service; and receiving a connection response from the network side based on the PDN connection request, wherein the connection response carries an address for the IMS registration.

Aspects of the disclosure also provide a device for Internet Protocol Multimedia Subsystem (IMS) registration, the device being applied to a terminal. The device includes a processor and a memory configured to store instructions executable for the processor. The processor is configured to determine whether a network side supports an IMS service; acquire, based on an IMS Access Point Name (APN), an address for the IMS registration when the network side supports the IMS service; perform the IMS registration based on the acquired address for the IMS registration; and initiate an IMS re-registration when the IMS registration fails.

Aspects of the disclosure also provide a non-transitory computer-readable storage medium storing instructions that, when executed by a processor of a terminal, cause the terminal to determine whether a network side supports an IMS service; acquire, based on an IMS Access Point Name (APN), an address for the IMS registration when the network side supports the IMS service; perform the IMS registration based on the acquired address for the IMS registration; and initiate an IMS re-registration when the IMS registration fails.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the specification, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of devices and methods consistent with aspects related to the disclosure as recited in the appended claims.

Figure 1A:
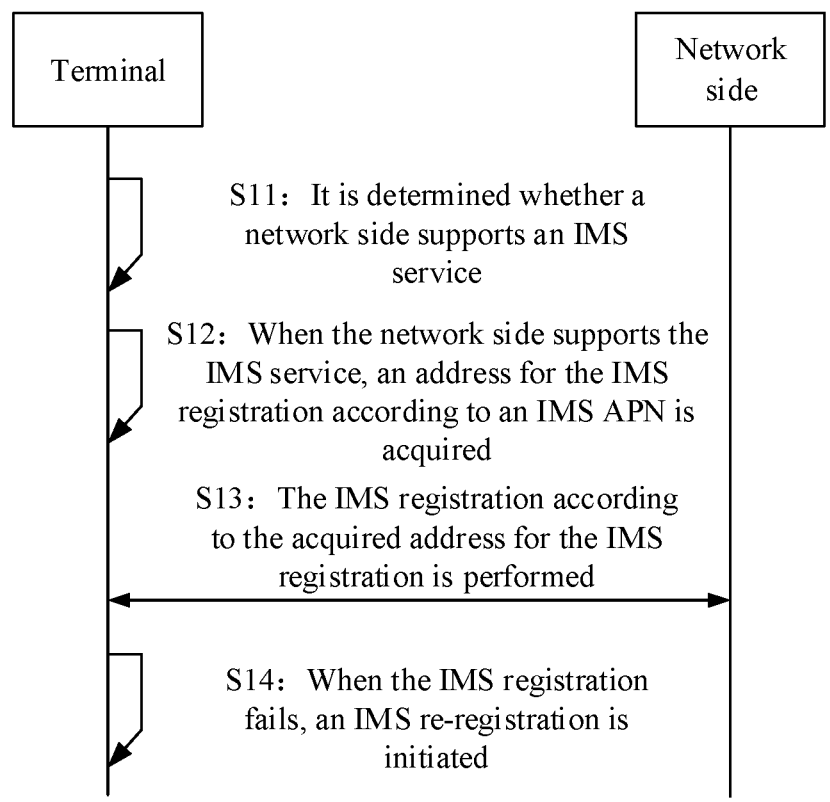
FIG. 1A is a flow diagram illustrating a method for IMS registration, according to an exemplary aspect of the present disclosure.

As illustrated in FIG. 1A, the present aspect provides a method for IMS registration, applied to a terminal. The method includes the following operations.

In S11, it is determined whether a network side supports an IMS service.

In S12, when the network side supports the IMS service, an address for the IMS registration is acquired according to an IMS APN.

In S13, the IMS registration is performed according to the acquired address for the IMS registration.

In S14, when the IMS registration fails, an IMS re-registration is initiated.

The method for IMS registration provided in the present aspect is applied to a terminal in an IMS service. For example, the terminal is a terminal which supports VoLTE. Specifically, the terminal may include: a mobile phone, a tablet, a wearable device, a smart home or smart office terminal, and the like.

The IMS service provides high-quality voice services, which include VoLTE and Voice over WiFi (VoWiFi).

The network side is relative to the terminal. The terminal is a wireless communication terminal, and performs information interaction with the network side through a wireless link. The network side may generally refer to a network connection, other than any terminal, that supports a communication between the terminal and other devices. For example, the network side includes: a wireless network and/or a core network. The wireless network includes access network elements, and typical access network elements include various types of base stations and/or WiFi hotspots.

In the aspect of the present disclosure, in S11, it is mainly determined whether the core network supports the IMS service. Network elements of the core network may include, but is not limited to, a Call Session Control Function (CSCF), an application server, a Home Subscriber Server (HSS), and the like. The terminal may be connected to the core network through an access network.

When it is determined that the network side supports the IMS service and the terminal is a terminal that supports the IMS service, in order to ensure the voice call quality of the terminal, the terminal triggers the acquisition for the address for the IMS registration by itself. The process of acquiring the address for the IMS registration may also be referred to as the process of establishing the IMS APN.

The address for the IMS registration may include: an IP address of an IMS server and an IP address of the terminal. When performing an IMS registration, an IMS registration request is sent with the address of the IMS server as a destination address and the IP address of the terminal as a source address, and a registration response to the IMS registration returned by the IMS server according to the IMS registration request is received.

The IMS APN for acquiring the address for the IMS registration may be recorded in the terminal in advance, so the terminal may acquire the IMS APN in advance before acquiring the address. The operation of acquiring the IMS APN may include:

configuration parameters of a mobile network data service are acquired. Here, the configuration parameters may include various types of APNs which are pre-configured, and different types of mobile network data services may have different APNs. The APN for mobile network data of the IMS service in the aspect of the present disclosure is referred to as an IMS APN.

Specifically, the configuration parameters are pre-configured in the terminal or received from a mobile network, and the APN corresponding to the IMS service in the configuration parameters is queried based on a service label of the IMS service, the IMS APN thereby is obtained.

For example, a communication operator may set one or more Public Land Mobile Networks (PLMNs), and different PLMNs may correspond to different APNs. Thus, the configuration parameters may be preset in a mobile terminal or a Mobile Subscriber identification (SIM). Therefore, in S12, the IMS APN may be obtained by reading a configuration file, which contains the configuration parameters, in the SIM.

The IMS registration may include that:

the terminal sends an IMS registration request to the network side according to the acquired address for the IMS registration; and a registration response returned by the network side according to the IMS registration request is received.

A result of the IMS registration may be carried in the registration response.

When performing the IMS registration, the interaction of a registration request and a registration response may be performed based on a Session Initiation Protocol (SIP).

Through the IMS registration, the terminal may obtain an authorization to use VoLTE. Thus, the network side may verify subscription information of the IMS service for the IMS service of the terminal, and then the terminal obtains an ability to acquire the IMS service through the network side. For example, the terminal obtains the function of using VoLTE through the network side. At the same time, the terminal may also obtain usage parameters of the IMS service through the IMS registration. The usage parameters include, but are not limited to, one of:

identification information, such as a call identity which is used in the IMS service; and routing information, such as a routing node(s) that is(are) to be passed through when sending and receiving service data of the IMS service of the terminal. The routing node may be a charging node for IMS service charging, a flow control node for flow control, or a policy node for IMS service control.

In summary, the terminal obtains various usage parameters and the authorization to use the IMS registration through the IMS registration.

The result of the IMS registration may include: registration success and registration failure.

When the IMS registration is successful, the terminal may use the MS service subsequently, and the process of the IMS registration ends.

When an IMS registration fails, an IMS re-registration is initiated, thereby avoiding a phenomenon that the IMS registration is no longer performed after a single IMS registration fails such that the IMS registration of the terminal will maintain a failure result, which will cause the terminal unable to use a voice call function of VOLTE based on the IMS registration. Therefore, according to the technical solution provided in the aspects of the present disclosure, the time period during which the terminal is in a failure state of IMS registration is reduced, the available time period for the voice call function of VoLTE is prolonged, and the voice call quality of the terminal is ensured.

In some aspects, S14 may include that: when the number of times that the IMS registration is performed does not reach a first preset threshold, an IMS re-registration is initiated.

Figure 1B:
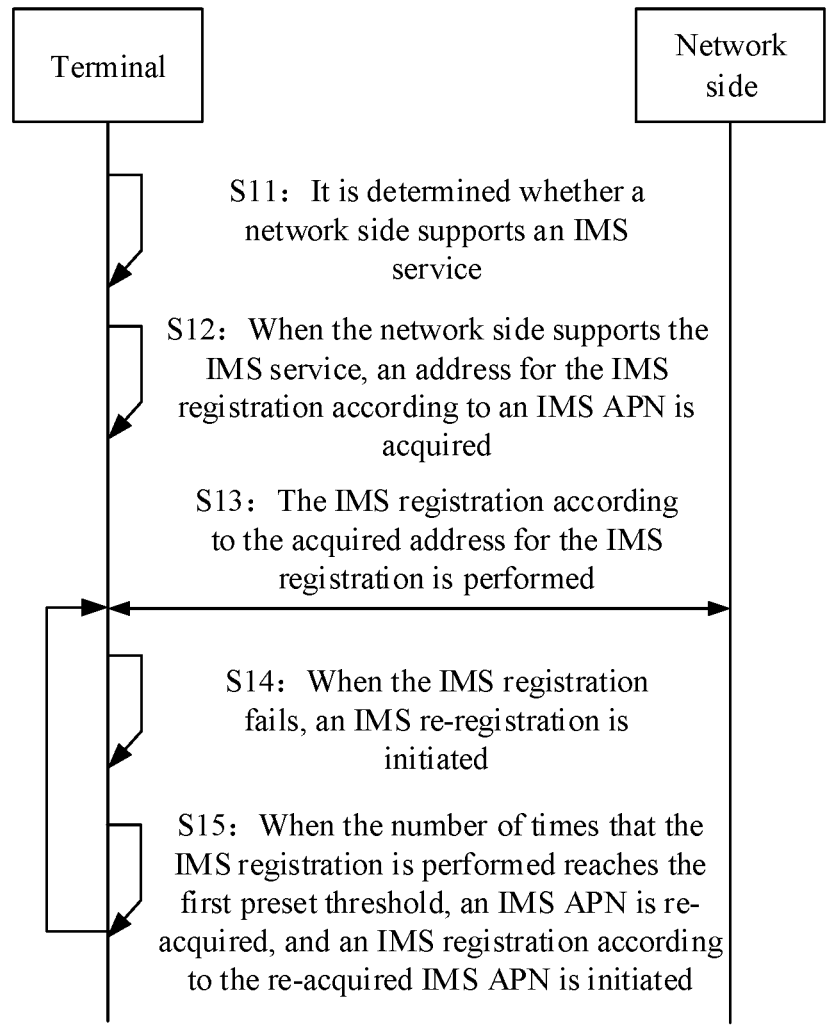
FIG. 1B is a flow diagram illustrating a method for IMS registration, according to an exemplary aspect of the present disclosure.

In some other aspects, as illustrated in FIG. 1B, the method may further include the following operations.

In S15, when the number of times that the IMS registration is performed reaches the first preset threshold, an address for the IMS registration is re-acquired, and an IMS registration is initiated according to the re-acquired address for the IMS registration.

In the aspect of the present disclosure, the first preset threshold may be any positive integer. Specifically, the first preset threshold may be equal to 1 or may be a positive integer not less than 2. When the first preset threshold is a positive integer greater than or equal to 2, the terminal records the number of times that the IMS registration is performed. When the number of times that the IMS registration is performed does not reach the first preset threshold, it is considered that the condition for re-acquiring the address for the IMS registration is not met, but an IMS re-registration is performed preferentially. Thus, through the IMS re-registration, the failure of the IMS registration during the IMS registration process is preferentially eliminated, thereby reducing the number of times that unnecessary acquisition for an address is performed.

If the IMS registration fails, in the aspect of the present disclosure, it is further determined whether a condition for re-acquiring the address is met. If the condition for re-acquiring the address is met, an IMS APN may be automatically re-acquired and an IMS registration according to the re-acquired address is triggered. Thus, if the IMS registration fails due to an error of address acquisition, the terminal automatically triggers the re-execution of the IMS registration according to the re-acquired address, such that the terminal completes the IMS registration. Of course, in some aspects, the address acquisition itself has no error, but the IMS registration still fails. At this time, the IMS re-registration may also be triggered by the address re-acquisition, so that the failure of the IMS registration which is caused by other reasons in the IMS registration may also be eliminated, thereby reducing the duration in which the terminal maintains the failure of the IMS registration, and ensuring the normal use of the IMS service of the terminal.

For example, when the first preset threshold is N, after an acquisition for the address for the IMS registration is completed, when N IMS registrations fail, it is determined that the condition for re-acquiring address is met, and the terminal automatically re-acquires the address for the IMS registration. Thus, one acquisition for the address by the terminal can trigger the terminal to perform N IMS registrations. When the nth IMS registration is successful, the current address acquisition triggers the execution of N IMS registrations. n is a positive integer less than N. It is to be noted that when the IMS service is implemented after the terminal completes one IMS registration, it is found that the IMS service fails to be provided, then the remaining number of IMS re-registrations triggered by the current address acquisition may be resumed, thereby reducing the duration in which the terminal is in an failure state of the IMS registration as much as possible.

Figure 2:
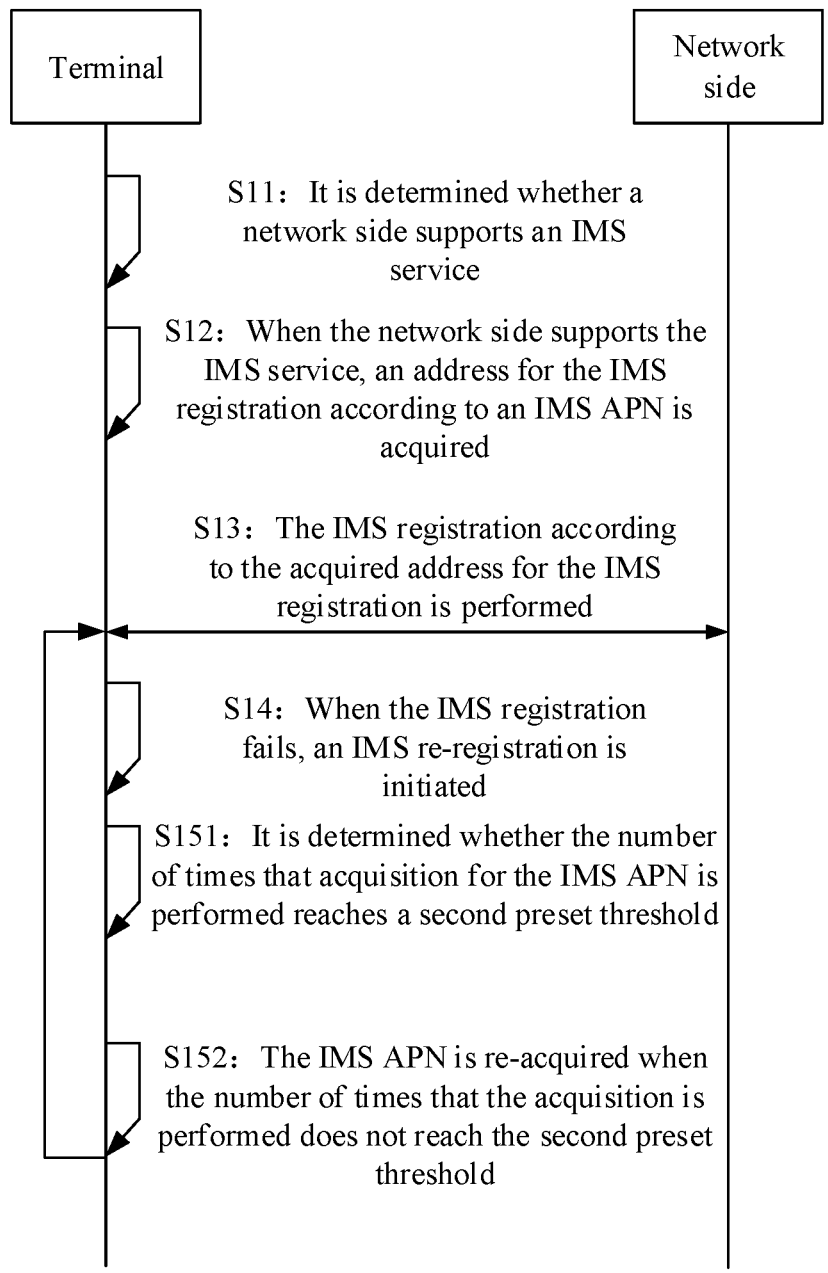
FIG. 2 is a flow diagram illustrating a method for IMS registration, according to an exemplary aspect of the present disclosure.

In some aspects, as illustrated in FIG. 2, S15 may include the following operations.

In S151, it is determined whether the number of times that acquisition for the address for the IMS registration is performed reaches a second preset threshold.

In S152, when the number of times that the acquisition is performed does not reach the second preset threshold, an address for the IMS registration is re-acquired.

In some aspects, a second preset threshold is set for the acquisition of the IMS APN. After the terminal is powered on currently or attached to the network currently, if the number of times that acquisitions for the address is performed has reached the second preset threshold, it may be impossible to eliminate fault by the acquisition for the address for the IMS registration. Therefore, on the one hand, in order to eliminate the fault of the IMS registration success as much as possible, and on the other hand, in order to reduce the number of times that unnecessary acquisition for address for the IMS registration is performed as much as possible, it is determined whether the number of times that acquisition for the address is performed has reached the second preset threshold after the terminal is powered on currently or attached to the network currently. The re-acquisition for the address for the IMS registration is performed only when the number of times that the acquisition is performed does not reach the second preset threshold.

The second preset threshold may be any positive integer. For example, the second preset threshold may be a positive integer of 1, 2 or more.

The second preset threshold may be an empirical value obtained according to a troubleshooting experience, or may be an experimental value obtained based on an experimental test. The second preset threshold may be obtained in various manners, which will not be further limited in the aspect of the present disclosure. The second preset threshold may be written to the terminal in advance, or may be delivered to the terminal in advance through an access network element such as a base station. For example, the second preset threshold is written into a SIM card. In some other aspects, the terminal may dynamically configure the second preset threshold according to its own state. For example, the terminal configures the second preset threshold according to its remaining power. The remaining power is positively related to the second preset threshold, that is, the higher the remaining power is, the larger the second preset threshold is.

Figure 3:
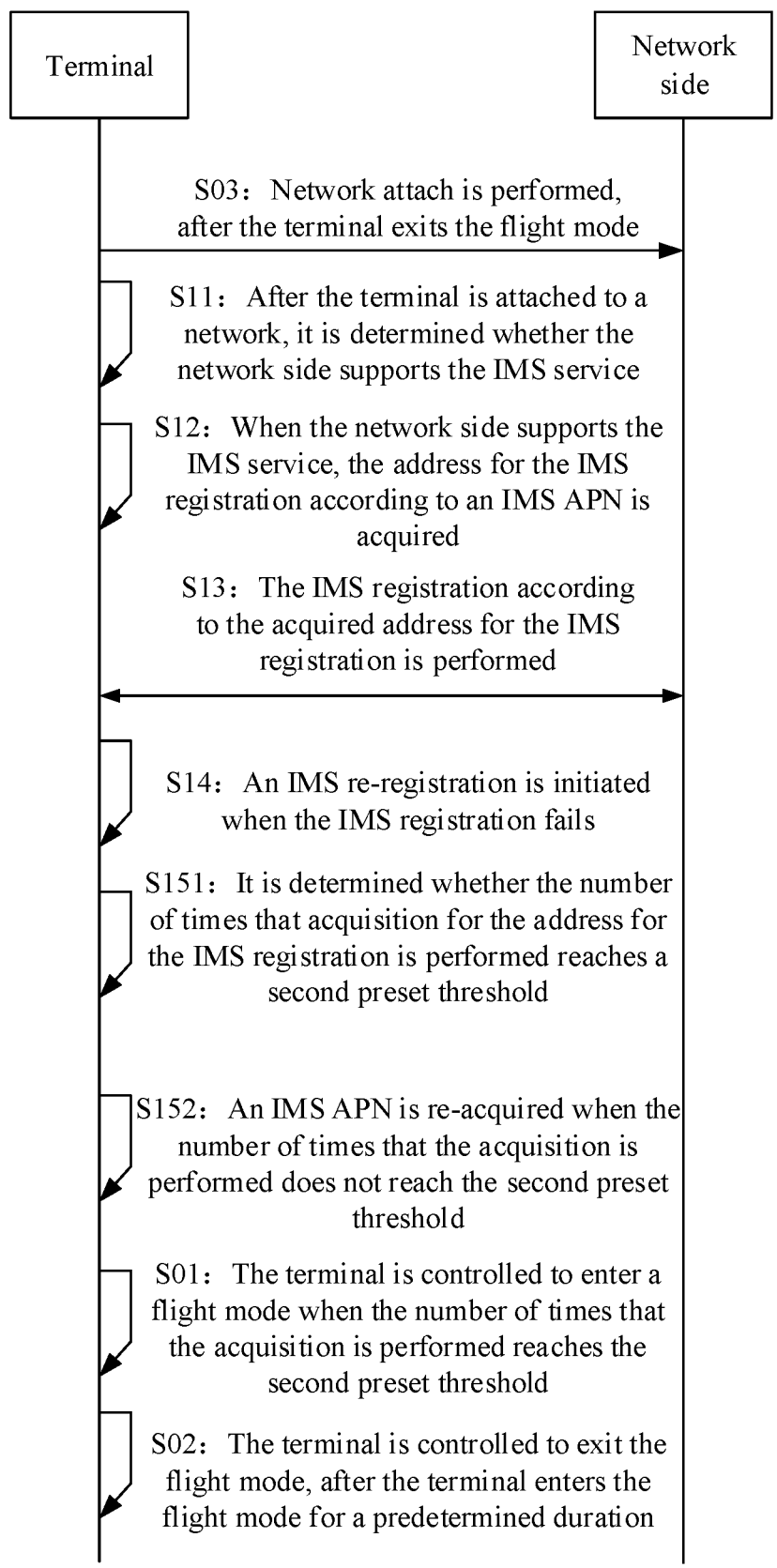
FIG. 3 is a flow diagram illustrating a method for IMS registration, according to an exemplary aspect of the present disclosure.

In some aspects, as illustrated in FIG. 3, the method further includes the following operations.

In S01, when the number of times that the acquisition is performed reaches the second preset threshold, the terminal is controlled to enter a flight mode.

In S02, after the terminal enters the flight mode for a predetermined duration, the terminal is controlled to exit the flight mode.

In S03, after the terminal exits the flight mode, network attach is performed.

S11 may include that: after the terminal is attached to a network, it is determined whether the network side supports the IMS service.

The flight mode is a mode in which the terminal cannot communicate. In the flight mode, the terminal leaves the network. When it is found that the number of times that the acquisition is performed during the current round of IMS registration process reaches the second preset threshold, the terminal will be controlled to enter the flight mode to further achieve the success of the IMS registration. After the terminal enters the flight mode, the terminal will leave the network. After the terminal enters the flight mode, it will switch out of the flight mode. The predetermined duration may be an arbitrary duration set in advance. For example, the predetermined duration may be a duration of 0.5 s, 1 s, 2 s, or the like.

In some aspects, in order to reduce the duration in which the flight mode makes the terminal unable to communicate as much as possible, the predetermined duration may be less than or equal to 3 s or 5 s.

After the terminal exits the flight mode, it will automatically search for the network again and be attached to the network. After the terminal is attached to the network, a new IMS registration process will be re-triggered. Firstly, after the terminal is attached to the network, S11 is automatically performed, so as to re-determine whether the network side supports the IMS service.

In some aspects, after the network attach, the execution starts with S12. However, the terminal may be mobile. After moving during the reattach process, the terminal may move into a network coverage range that does not support the IMS service. In order to eliminate that the repeated IMS registration is caused by a confirmation error of a result of whether the network side supports the IMS service, after the terminal is attached to the network, it may be re-determined whether the network side supports the IMS service to trigger the current round of IMS registration. A round of IMS registration may include up to M acquisitions for the address for the IMS registration, and up to N*M IMS registrations. M may be the second preset threshold, and N may be the first preset threshold.

In some aspects, the first preset thresholds corresponding to any reason for a failure of the IMS registration may be the same. For example, the first preset thresholds corresponding to the IMS registration failures caused by the server rejection and by the transmission failure of the IMS registration request may be the same or different.

However, in order to reduce unnecessary repeated IMS registrations, the present disclosure dynamically sets the first preset threshold according to the reason for registration failure.

For example, the method may further include that: a reason for a failure of the IMS registration is received; and the first preset threshold is determined according to the reason.

Further, the operation that the first preset threshold is determined according to the reason may include that:

when the reason for the failure of the IMS registration is that a registration request of the IMS registration is lost, it is determined that the first preset threshold has a first value; and when the reason for the failure of the IMS registration is that an IMS server refuses to register, it is determined that the first preset threshold has a second value, the second value is less than the first value.

In some aspects, the loss of a registration request may be due to the fact that the current network connection is unstable, and the registration request drops packets during the transmission process, resulting in that the registration request is not successfully transmitted to the IMS server.

In some other aspects, the loss of a registration request may be due to the fact that a destination address carried in the registration request is wrong or tampered with.

Possible reasons for the IMS server to refuse the IMS registration of the terminal may be as follows:

the IMS server is overloaded;

software and/or hardware abnormalities occur on the IMS server;

the verification of the IMS registration of the terminal is different. For example, the server determines that the current terminal requesting registration may be an illegal terminal. For example, when it is determined that the terminal is a terminal in a blacklist, the terminal is determined as an illegal terminal.

The first value is set to be greater than the second value according to the probability that the faults corresponding to two reasons are eliminated, so that on the one hand, unnecessary IMS registrations are reduced, and on the other hand, the IMS registration of the terminal can be made as successful as possible.

For example, a plurality of IMS APNs may be configured in the terminal. When the IMS registration triggered by an address for the IMS registration for which an IMS APN is acquired fails, the terminal polls the next IMS APN according to the address for the IMS registration which is used in the failed IMS registration. Different IMS APNs correspond to different IMS servers. Thus, IMS APNs acquired in two successive registrations are different, addresses for IMS servers acquired in two adjacent registrations are different, so that the number of times that the IMS registration is repeatedly refused by an IMS server corresponding to one address for the IMS registration is reduced when the first preset threshold is equal to the second value. Thus, on the one hand, the number of times that the IMS registration is repeatedly performed is reduced when the IMS server refuses the IMS registration, and on the other hand, load balancing can be implemented between different IMS servers.

In some aspects, the method may further include that:
an attach request is sent to the network side; and
an attach accepted returned by the network side according to the attach request is received.

S11 may include that:
It is determined whether the network side supports the IMS service according to an IMS service support indication field carried in the attach request.

After the terminal is powered on or switches out of the flight mode, the terminal will automatically send an attach request to the network side. If the network side allows the terminal to attach, an attach accepted may be sent to the terminal. The attach accepted indicates accepting the attachment of terminal. In addition, the attach accepted may carry an IMS service support indication field which indicates whether the network side supports the IMS service.

For example, in some aspects, the IMS service support indication field may be an IMSVoPS field. When the value of the IMSVoPS field is "IMS Vo PS session in S1 Mode supported", it indicates that the network side supports the IMS service.

S11 may include that: the attach accepted is read and parsed, and it is determined whether the network side supports the IMS service according to the content of the IMS service support indication field.

After the terminal is successfully attached to the network, the terminal will establish a connection with the network side and enter a connected state. At the same time, the terminal will complete the IMS registration through the execution of steps S11 to S15. The terminal may perform any information interaction with the base station through entering the connected state. High-quality voice services may be initiated by the terminal through the IMS registration. Thus, the establishment process of the connection between the terminal and the network side may be performed in parallel with the IMS registration, so that after the terminal is turned on or exits the flight mode, it can enter the initialization of various functions as much as possible, thereby making users able to respond as quickly as possible when using various functions.

In some aspects, S12 may include that: when the network side supports the IMS service, an address for the IMS registration is acquired according to an IMS APN to obtain an IP address of the terminal and an IP address of an IMS server.

The operation that an IMS registration is performed according to the acquired address for the IMS registration may include that:
an IMS registration request is sent to the application server with an IP address of the terminal as a source address and an IP address of the IMS server as a destination address; and
a registration response returned by the application server according to the IMS registration request is received.

The registration response may be a response indicating registration success or a response indicating registration failure. If the registration response is a response indicating registration failure, the registration response may also carry a reason for the failure of the IMS registration. Thus, the terminal may dynamically determine the first preset threshold according to the reason.

Figure 4:
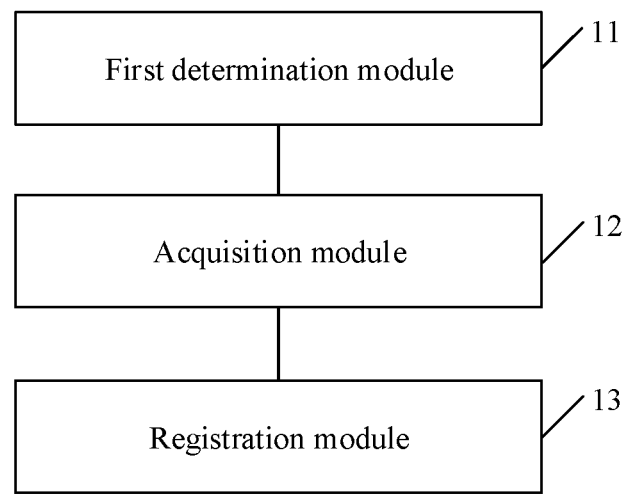
FIG. 4 is a structural diagram illustrating a device for IMS registration, according to an exemplary aspect of the present disclosure.

As illustrated in FIG. 4, the present aspect also provides a device for IMS registration, applied to a terminal. The device may include:

a first determination module 11, configured to determine whether a network side supports an IMS service;
an acquisition module 12, configured to acquire, when the network side supports the IMS service, an address for the IMS registration according to an IMS APN; and
a registration module 13, configured to perform the IMS registration according to the acquired address for the IMS registration.

In some aspects, the first determination module 11, the acquisition module 12 and the registration module 13 may be program modules. After being executed by the processor, the program modules may implement operations corresponding to the respective modules.

In some other aspects, the first determination module 11, the acquisition module 12 and the registration module 13 may be combined modules of software and hardware, which include but not limited to programmable arrays. The programmable arrays include, but are not limited to, complex programmable arrays or field programmable arrays.

In some aspects, the first determination module 11, the acquisition module 12 and the registration module 13 may be pure hardware modules, which include but are not limited to Application Specific Integrated Circuit (ASIC).

In some aspects, the registration module 13 is further configured to initiate an IMS re-registration when the number of times that the IMS registration is performed does not reach a first preset threshold.

In some other aspects, the acquisition module is further configured to re-acquire, when the number of times that the IMS registration is performed reaches the first preset threshold, an address for the IMS registration and to initiate the IMS registration according to the re-acquired address for the IMS registration.

In some aspects, the acquisition module 12 is further configured to determine whether the number of times that acquisition for the address for the TMS registration is performed reaches a second preset threshold, and to re-acquire, when the number of times that the acquisition is performed does not reach the second preset threshold, an address for the IMS registration.

In some aspects, the device may further include:
a first control module, configured to control, when the number of times that the acquisition is performed reaches the second preset threshold, the terminal to enter a flight mode;
a second control module, configured to control, after the terminal enters the flight mode for a predetermined duration, the terminal to exit the flight mode; and
an attach module, configured to perform, after the terminal exits the flight mode, network attach.

The first determination module 11 is configured to determine, after the terminal is attached to a network, whether the network side supports the IMS service.

In some aspects, the device may further include:
a first receiving module, configured to receive a reason for a failure of the IMS registration; and
a second determination module, configured to determine, according to the reason, the first preset threshold.

In some aspects, the second determination module is configured to determine that the first preset threshold has a first value when the reason for the failure of the IMS registration is that a registration request of the IMS registration is lost; and to determine that the first preset threshold has a second value when the reason for the failure of the IMS registration is that an IMS server refuses to register. The second value is less than the first value.

In some aspects, the device may further include:

a first sending module, configured to send an attach request to the network side; and a second receiving module, configured to receive an attach accepted returned by the network side according to the attach request.

The first determination module 11 is configured to determine whether the network side supports the IMS service according to an IMS service support indication field carried in the attach request.

In some aspects, the acquisition module 12 is configured to acquire, when the network side supports the IMS service, an address for the IMS registration according to an IMS APN to obtain an IP address of the terminal and an IP address of an IMS server.

With regard to the device in the above aspects, the specific manner in which the respective modules perform the operations has been described in detail in the aspect relating to the method, and will not be explained in detail herein.

An example is provided below in combination with any of the above aspects:

Example 1

During an attach process, a terminal will receive the confirmation from a network side about whether the network side supports an IMS service.

An Application Processor (AP) of the terminal initiates establishment of an IMS APN according to a report of the bottom, and waits for the bottom to report a state of the IMS registration.

After the IMS APN is established, a modem of the terminal initiates an IMS registration process. If the IMS registration fails, the number of times that an IMS registration request is re-sent is set according to different reason values, and an IMS registration request is re-sent.

If the registration fails, an indication of registration failure is reported to the AP.

If the registration is successful, an indication of registration success is reported to the AP.

After the AP receives the indication of registration failure reported from the modem, the number of times that an IMS APN establishment process is re-initiated may be set to re-initiate an IMS APN establishment process and trigger the IMS registration process of the bottom.

An aspect of the present disclosure also provides a terminal, which may include:

a processor; and a memory configured to store instructions executable for the processor, where the processor is configured to perform the method for IMS registration provided in any of the preceding technical solutions.

Specifically, the processor is configured to implement, by executing the executable instructions, the following steps:

it is determined whether a network side supports an IMS service;

when the network side supports the IMS service, an address for the IMS registration is acquired according to an IMS APN;

an IMS registration is performed according to the acquired address for the IMS registration; and when the IMS registration fails, an IMS re-registration is performed.

Further, the operation that the IMS re-registration is initiated when the IMS registration fails may include that:

when the number of times that the IMS registration is performed does not reach a first preset threshold, an IMS re-registration is initiated.

Further, when the number of times that the IMS registration is performed reaches the first preset threshold, an address for the IMS registration is re-acquired, and an IMS registration is initiated according to the re-acquired address for the IMS registration.

Further, the operation that the address for the IMS registration is re-acquired and the IMS registration is initiated according to the re-acquired address for the IMS registration when the number of times that the IMS registration is performed reaches the first preset threshold may include that:

it is determined whether a number of times that acquisition for the address for the IMS registration is performed reaches a second preset threshold; and when the number of times that the acquisition is performed does not reach the second preset threshold, the address for the IMS registration is re-acquired.

Further, when the number of times that the acquisition is performed reaches the second preset threshold, the terminal is controlled to enter a flight mode.

After the terminal enters the flight mode for a predetermined duration, the terminal is controlled to exit the flight mode.

After the terminal exits the flight mode, network attach is performed.

The operation that it is determined whether a network side supports an IMS service may include that:

after the terminal is attached to a network, it is determined whether the network side supports the IMS service.

Further, a reason for a failure of the IMS registration is received.

The first preset threshold is determined according to the reason.

Further, the operation that the first preset threshold is determined according to the reason may include that:

when the reason for a failure of the IMS registration is that a registration request of the IMS registration is lost, it is determined that the first preset threshold has a first value; and when the reason for a failure of the IMS registration is that an IMS server refuses to register, it is determined that the first preset threshold has a second value, the second value is less than the first value.

Further, an attach request is sent to the network side.

An attach accepted returned by the network side according to the attach request is received.

The operation that it is determined whether the network side supports the IMS service may include that:

it is determined whether the network side supports the IMS service according to an IMS service support indication field carried in the attach request.

Further, the operation that the address for the IMS registration is acquired according to an IMS APN when the network side supports the IMS service may include that:

a PDN connection request is sent to the network side; and a connection response returned by the network side according to the PDN connection request is received, the connection response carries an address for the IMS registration.

The operation that an IMS registration is performed according to the acquired address for the IMS registration may include that:

an IMS registration request is sent to the application server with an IP address of the terminal as a source address and an IP address of the IMS server as a destination address; and a registration response returned by the application server according to the IMS registration request is received.

Figure 5:
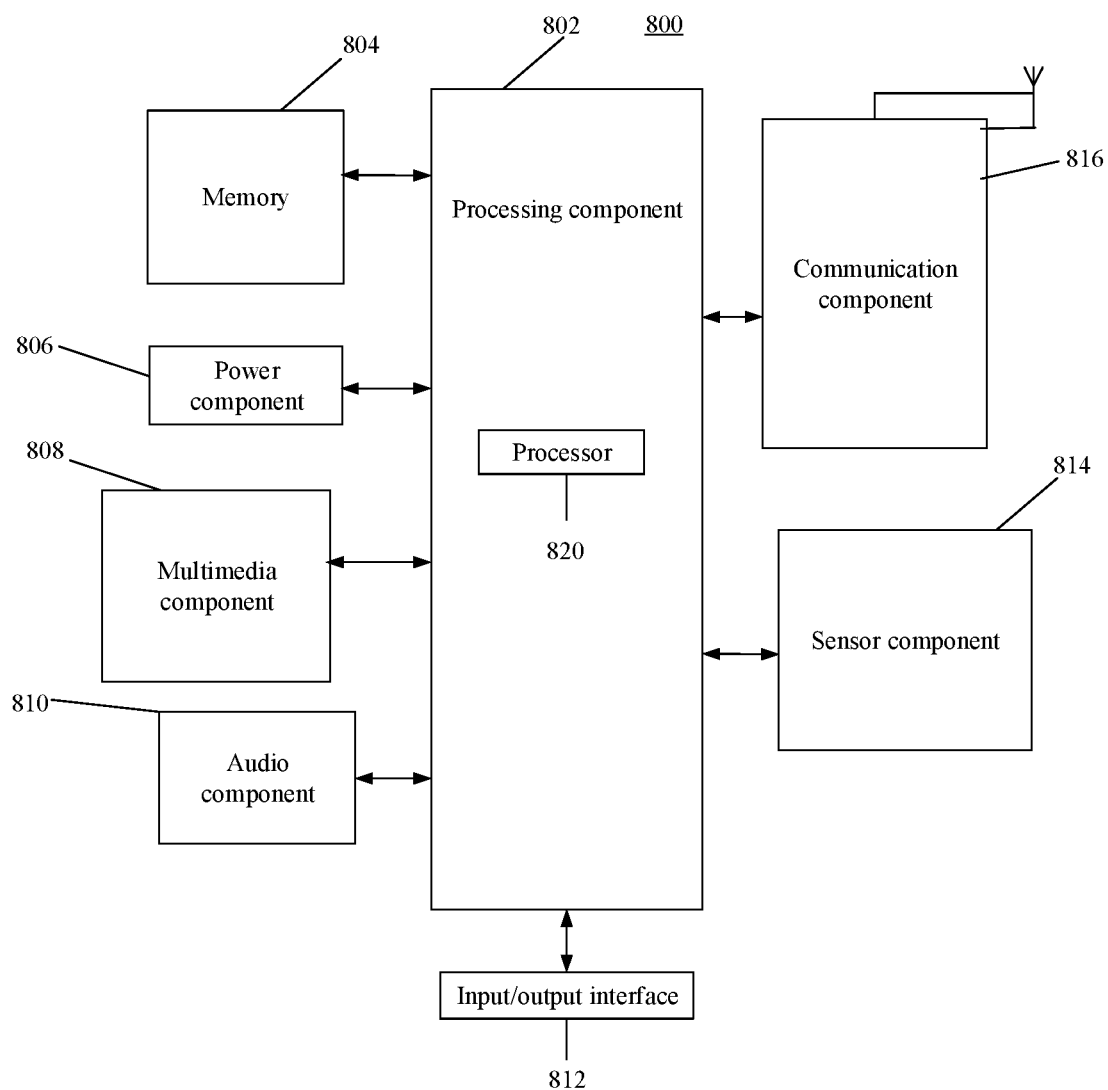
FIG. 5 is a structural diagram illustrating a terminal, according to an exemplary aspect of the present disclosure.

FIG. 5 is a block diagram illustrating a terminal 800 for an IMS registration according to an exemplary aspect. For example, the terminal 800 may be a mobile phone, a computer, a digital broadcast terminal, a messaging device, a gaming console, a tablet, a medical device, exercise equipment, a personal digital assistant, and the like.

Referring to FIG. 5, the terminal 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal 800, such as operations associated with display, telephone calls, data communications, camera operations, and recording operations. The processing component 802 may include one or more processors 820 for executing instructions to complete all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support operations on the device 800. Examples of such data include instructions for any application or method operated on the terminal 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the terminal 800. The power component 806 may include a power management system, one or more power sources, and any other components which are associated with the generation, management and distribution of power for the terminal 800.

The multimedia component 808 includes a screen providing an output interface between the terminal 800 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect the duration and pressure which are associated with the touch or swipe action. In some aspects, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or may have focusing and optical zooming capabilities.

The audio component 810 is configured to output and/or input audio signals. For example, the audio component 810 includes a Microphone (MIC). The MIC is configured to receive an external audio signal when the terminal 800 is in an operation mode, such as a call mode, a recording mode, and a voice recognition mode. The received audio signal may be further stored in the memory 804 or transmitted via the communication component 816. In some aspects, the audio component 810 further includes a speaker for outputting the audio signal.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors for providing various aspects of status assessments for the terminal 800. For example, the sensor component 814 may detect an on/off state of the device 800 and relative positioning of components. For example, the component is a display and small keyboard of the terminal 800. The sensor component 814 may further detect the position change of the terminal 800 or the position change of an component of the terminal 800, presence or absence of a contact between the user and the terminal 8x, orientation or acceleration/deceleration of the terminal 800, and the temperature change of the terminal 800. The sensor component 814 may include a proximity sensor which is configured to detect presence of a nearby object without any physical contact. The sensor component 814 may also include a light sensor, such as a Complementary Metal Oxide Semiconductor (CMOS) or Charge Coupled Device (CCD) image sensor which is configured for being used in an imaging application. In some aspects, the sensor component 814 may also include an acceleration sensor, a gyroscope sensor, a magnetic sensor, a pressure sensor or a temperature sensor.

The communication component 816 is configured to facilitate a wired or wireless communication between the terminal 800 and other devices. The terminal 800 may access a wireless network based on a communication standard, such as WiFi, 2G or 3G, or a combination thereof. In an exemplary aspect, the communication component 816 receives a broadcast signal or broadcast related information from an external broadcast management system via a broadcast channel. In an exemplary aspect, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary aspects, the terminal 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary aspects, there is also provided a non-transitory computer readable storage medium including instructions, such as the memory 804 including instructions, which are executable by the processor 820 of the terminal 800 to perform the above described methods. For example, the non-transitory computer readable storage medium may be a ROM, a Random Access Memory (RAM), a Compact Disc Read-Only Memory (CD-ROM), a magnetic tape, a floppy disc, an optical data storage device and the like.

According to an aspect of the present disclosure, there is also provided a non-transitory computer readable storage medium having stored instructions that when being executed by a processor of a mobile terminal, enables the terminal to perform the method for IMS registration. The method may be the preceding IMS registration method that is applied to a terminal and provided in the respective technical solutions. The method may specifically include that:

it is determined whether a network side supports an IMS service;

when the network side supports the IMS service, an address for the IMS registration is acquired according to an IMS APN;

the IMS registration is performed according to the acquired address;

when the IMS registration fails, it is determined whether an address re-acquisition condition is met; and when the address re-acquisition condition is met, an address for the IMS registration is re-acquired, and the IMS registration is re-performed.

Further, the operation that it is determined whether an address re-acquisition condition is met includes:

when the number of times that the IMS registration is performed reaches a first preset threshold, it is determined that the address re-acquisition condition is met.

Further, when the IMS registration fails and the number of times that the IMS registration is performed does not reach the first preset threshold, the IMS re-registration is performed.

Further, the operation that the address for the IMS registration is re-acquired and the IMS registration is re-performed when the address re-acquisition condition is met may include that:

it is determined whether the number of times that acquisition for the address for the IMS registration is performed reaches a second preset threshold; and when the number of times that the acquisition is performed does not reach the second preset threshold, an address for the IMS registration is re-acquired.

Further, the method may further include that:

when the number of times that the acquisition is performed reaches the second preset threshold, the terminal is controlled to enter a flight mode;

after the terminal enters the flight mode for a predetermined duration, the terminal is controlled to exit the flight mode; and after the terminal exits the flight mode, network attach is performed.

The operation that it is determined whether the network side supports the IMS service may include that:

after the terminal is attached to a network, it is determined whether the network side supports the IMS service.

Further, the method may further include that:

a reason for a failure of the IMS registration is received; and the first preset threshold is determined according to the reason.

Further, the operation that the first preset threshold is determined according to the reason may include that:

when the reason for the failure of the IMS registration is that a registration request of the IMS registration is lost, it is determined that the first preset threshold has a first value; and when the reason for the failure of the IMS registration is that an IMS server refuses to register, it is determined that the first preset threshold has a second value, the second value is less than the first value.

Further, the method may further include that:

an attach request is sent to the network side; and an attach accepted returned by the network side according to the attach request is received.

The operation that it is determined whether the network side supports the IMS service may include that:

it is determined whether the network side supports the IMS service according to an IMS service support indication field carried in the attach request.

Further, the operation that the address for the IMS registration is acquired according to an IMS APN when the network side supports the IMS service may include that:

a PDN connection request is sent to the network side; and a connection response returned by the network side according to the PDN connection request is received, the connection response carries an IMS registered address.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for Internet Protocol Multimedia Subsystem (IMS) registration, the method being applied to a terminal, and the method comprising:

determining whether a network side supports an IMS service;

acquiring, based on an IMS Access Point Name (APN), an address for the IMS registration when the network side supports the IMS service;

performing the IMS registration based on the acquired address for the IMS registration;

initiating an IMS re-registration when the IMS registration fails by initiating the IMS re-registration when a number of times that the IMS registration is performed does not reach a first preset threshold;

re-acquiring an address for an IMS registration when the number of times that the IMS registration is performed reaches the first preset threshold by:

determining whether a number of times that acquisition for the address the IMS registration is performed reaches a second preset threshold, wherein the second preset threshold is two or more; and
re-acquiring the address for the IMS registration when the number of times that the acquisition is performed does not reach the second preset threshold:
initiating the IMS registration based on the re-acquired address for the IMS registration;
controlling the terminal to enter a flight mode when the number of times that the acquisition is performed reaches the second preset threshold;
controlling the terminal to exit the flight mode after the terminal enters the flight mode for a predetermined duration;
performing network attach after the terminal exits the flight mode; and
determining whether the network side supports the IMS service after the terminal is attached to a network.

2. The method of claim 1, further comprising:
receiving a reason for a failure of the IMS registration; and
determining the first preset threshold based on the reason.

3. The method of claim 2, wherein determining the first preset threshold based on the reason comprises:
determining that the first preset threshold has a first value when the reason for the failure of the IMS registration is that a registration request of the IMS registration is lost; and
determining that the first preset threshold has a second value when the reason for the failure of the IMS registration is that an IMS server refuses to register, wherein the second value is less than the first value.

4. The method of claim 1, further comprising:
sending an attach request to the network side;
receiving an attach acceptance from the network side based on the attach request; and
determining whether the network side supports the IMS service based on an IMS service support indication field carried in the attach request.

5. The method of claim 1, wherein acquiring, based on the IMS APN, the address for the IMS registration when the network side supports the IMS service comprises:
sending a Public Data Network (PDN) connection request to the network side when the network side supports the IMS service; and
receiving a connection response from the network side based on the PDN connection request, wherein the connection response carries an address for the IMS registration.

6. A device for Internet Protocol Multimedia Subsystem (IMS) registration, the device being applied to a terminal, and the device comprising:
a processor; and
a memory configured to store instructions executable for the processor,
wherein the processor is configured to:
determine whether a network side supports an IMS service;
acquire, based on an IMS Access Point Name (APN), an address for the IMS registration when the network side supports the IMS service;
perform the IMS registration based on the acquired address for the IMS registration; and
initiate an IMS re-registration when the IMS registration fails by initiating the IMS re-registration when a number of times that the IMS registration is performed does not reach a first preset threshold;
re-acquire an address for an IMS registration when the number of times that the IMS registration is performed reaches the first preset threshold by:
determining whether a number of times that acquisition for the address the IMS registration is performed reaches a second preset threshold, wherein the second preset threshold is two or more; and
re-acquiring the address for the IMS registration when the number of times that the acquisition is performed does not reach the second preset threshold:
initiate the IMS registration based on the re-acquired address for the IMS registration;
control the terminal to enter a flight mode when the number of times that the acquisition is performed reaches the second preset threshold;
control the terminal to exit the flight mode after the terminal enters the flight mode for a predetermined duration;
perform network attach after the terminal exits the flight mode; and
determine whether the network side supports the IMS service after the terminal is attached to a network.

7. The device of claim 6, wherein the processor is further configured to:
receive a reason for a failure of the IMS registration; and
determine the first preset threshold based on the reason.

8. The device of claim 7, wherein the processor is further configured to:
determine that the first preset threshold has a first value when the reason for the failure of the IMS registration is that a registration request of the IMS registration is lost; and
determine that the first preset threshold has a second value when the reason for the failure of the IMS registration is that an IMS server refuses to register, wherein the second value is less than the first value.

9. The device of claim 6, wherein the processor is further configured to:
send an attach request to the network side;
receive an attach accepted returned by the network side based on the attach request; and
determine whether the network side supports the IMS service based on an IMS service support indication field carried in the attach request.

10. The device of claim 6, wherein the processor is further configured to:
send a Public Data Network (PDN) connection request to the network side when the network side supports the IMS service; and
receive a connection response returned by the network side based on the PDN connection request, wherein the connection response carries an address for the IMS registration.

11. A non-transitory computer-readable storage medium storing instructions that, when executed by a processor of a terminal, cause the terminal to:
determine whether a network side supports an IMS service;
acquire, based on an IMS Access Point Name (APN), an address for the IMS registration when the network side supports the IMS service;
perform the IMS registration based on the acquired address for the IMS registration; and
initiate an IMS re-registration when the IMS registration fails by initiating the IMS re-registration when a number of times that the IMS registration is performed does not reach a first preset threshold;
re-acquire an address for an IMS registration when the number of times that the IMS registration is performed reaches the first preset threshold by:
  determining whether a number of times that acquisition for the address the IMS registration is performed reaches a second preset threshold, wherein the second preset threshold is two or more; and
  re-acquiring the address for the IMS registration when the number of times that the acquisition is performed does not reach the second preset threshold:
initiate the IMS registration based on the re-acquired address for the IMS registration;
control the terminal to enter a flight mode when the number of times that the acquisition is performed reaches the second preset threshold;
control the terminal to exit the flight mode after the terminal enters the flight mode for a predetermined duration;
perform network attach after the terminal exits the flight mode; and
determine whether the network side supports the IMS service after the terminal is attached to a network.

* * * * *